United States Patent
Kotrla et al.

(10) Patent No.: US 9,077,479 B2
(45) Date of Patent: Jul. 7, 2015

(54) METHOD AND SYSTEM FOR ADJUSTING NETWORK INTERFACE METRICS

(75) Inventors: Scott R. Kotrla, Wylie, TX (US);
Christopher N. DelRegno, Rowlett, TX (US); Matthew W. Turlington, Richardson, TX (US); Michael U. Bencheck, Richardson, TX (US); Richard C. Schell, Allen, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1986 days.

(21) Appl. No.: 12/205,955

(22) Filed: Sep. 8, 2008

(65) Prior Publication Data
US 2010/0061721 A1    Mar. 11, 2010

(51) Int. Cl.
*H04B 17/00*    (2006.01)
*H04J 14/02*    (2006.01)
*H04L 12/24*    (2006.01)
*H04L 12/26*    (2006.01)

(52) U.S. Cl.
CPC ......... *H04J 14/0241* (2013.01); *H04L 41/5019* (2013.01); *H04L 43/16* (2013.01); *H04J 14/0269* (2013.01); *H04J 14/0271* (2013.01); *H04J 14/028* (2013.01); *H04J 14/0283* (2013.01); *H04J 14/0286* (2013.01); *H04J 14/0212* (2013.01)

(58) Field of Classification Search
None
See application file for complete search history.

(56) References Cited

U.S. PATENT DOCUMENTS

| | | | | |
|---|---|---|---|---|
| 6,690,884 | B1 * | 2/2004 | Kelty et al. ..................... | 398/27 |
| 6,915,463 | B2 * | 7/2005 | Vieregge et al. ............... | 398/27 |
| 7,477,843 | B1 * | 1/2009 | Peeters et al. .................. | 398/57 |
| 2004/0022539 | A1 | 2/2004 | Bannister et al. | |
| 2005/0191053 | A1 | 9/2005 | Levinson et al. | |
| 2006/0153174 | A1 | 7/2006 | Towns-Von Stauber et al. | |
| 2006/0268727 | A1 | 11/2006 | Rangarajan et al. | |
| 2009/0022489 | A1 * | 1/2009 | Way ................................ | 398/4 |

FOREIGN PATENT DOCUMENTS

CN    1722861    1/2006

* cited by examiner

*Primary Examiner* — Julio J Maldonado
*Assistant Examiner* — Sean Hagan (57) ABSTRACT

An approach is provided for adjusting network interface metrics to optimize transmissions across a network. A measurement of performance of a network interface is made, wherein the network interface is configured to provide traffic across an optical network. A determination is made regarding whether the measured performance satisfies a predetermined threshold. A network metric value of the network interface is adjusted if the measured performance of the network interface satisfies the predetermined threshold.

20 Claims, 8 Drawing Sheets

METHOD AND SYSTEM FOR ADJUSTING NETWORK INTERFACE METRICS

BACKGROUND OF THE INVENTION

Telecommunications networks have developed from connection-oriented, circuit-switched (CO-CS) systems, e.g., such as the public switched telephone network (PSTN), utilizing constant bit-rate, predefined point-to-point connections to connectionless, packet-switched (CNLS) systems, such as the Internet, utilizing dynamically configured routes characterized by one or more communication channels divided into arbitrary numbers of variable bit-rate channels. With the increase in demand for broadband communications and services, telecommunications service providers are beginning to integrate long-distance, large-capacity optical communication networks with these traditional CO-CS and CNLS systems. Typically, these optical communication networks utilize multiplexing transport techniques, such as time-division multiplexing (TDM), wavelength-division multiplexing (WDM), and the like, for transmitting information over optical fibers. However, an increase in demand for more flexible, resilient transport is driving optical communication networks toward high-speed, large-capacity packet-switching transmission techniques.

Such optical communication networks can experience significant fluctuations in traffic due to many factors, such as increases or decreases in the number of customers allocated to use the network and/or components of the network, changes in the structure of the network that increase of decrease capacity of the network and/or of components of the network, and fluctuations in usage that can be somewhat predictable or cyclical in nature, as well as random or bursty in nature. Certain dynamic performance changes that affect data flow along network interfaces may not be visible by the routers and other devices used to direct traffic through the network, and therefore the paths utilized by the routers to transfer data may not be optimal.

Therefore, there is a need for an approach that provides packet-based networks with efficient techniques for monitoring and adjusting router interface selection in response to changes in network interface performance.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for adjusting network interface metrics are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to packet-switched networks, such as an Internet Protocol (IP) network, it is contemplated that various exemplary embodiments are applicable to other transport environments, and technologies.

Figure 1:
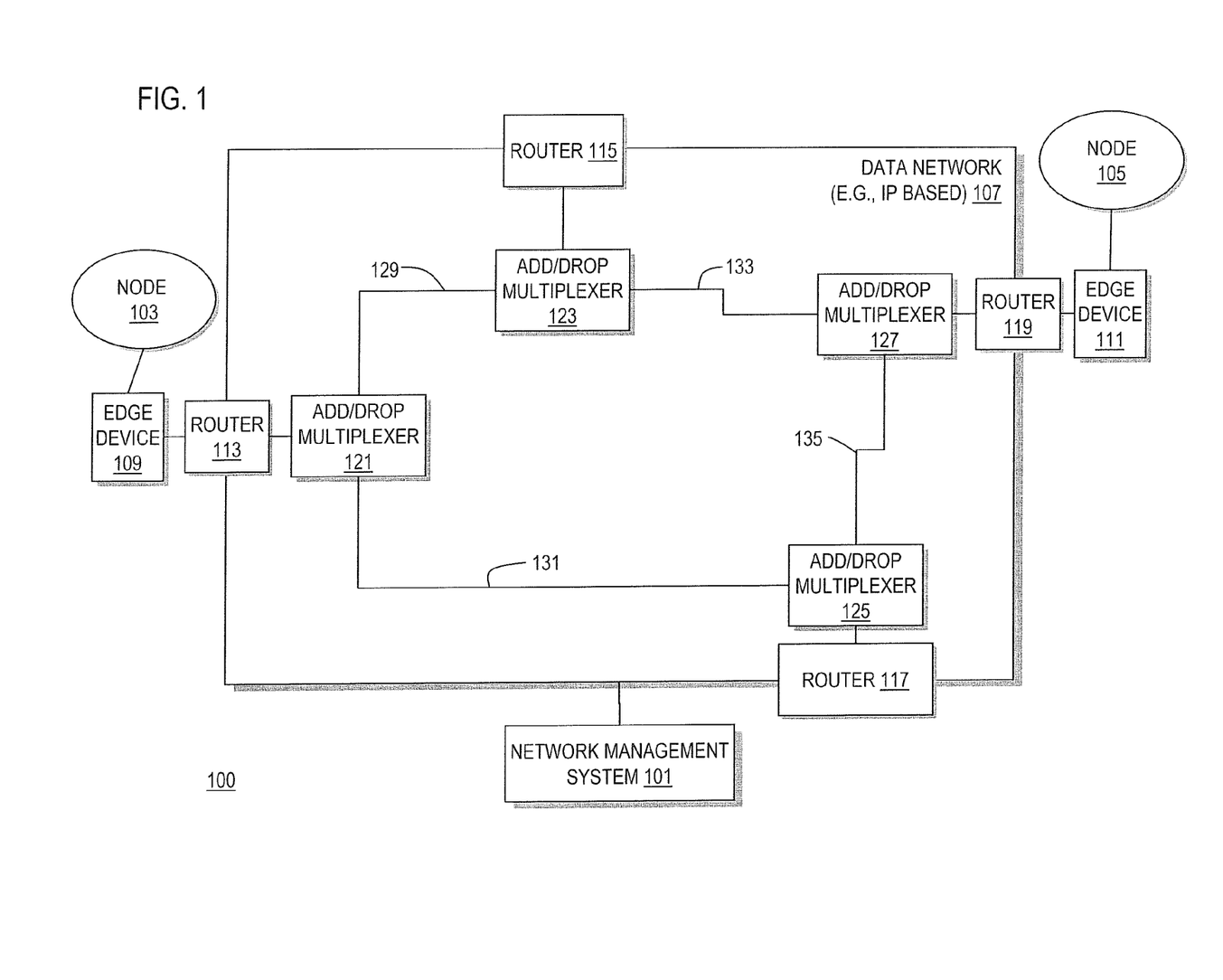
FIG. 1 is a schematic diagram of a communication system capable of adjusting network interface metrics for rerouting traffic, according to an exemplary embodiment.

FIG. 1 is a schematic diagram of a communication system capable of adjusting network interface metrics for rerouting traffic, according to an exemplary embodiment For the purposes of illustration, a communication system 100 employs a network management system 101 to adjust network interface metrics and selection, for example, when communication nodes 103 and 105 communicate via data communication network 107 (e.g., Internet Protocol (IP) network). The nodes 103, 105 can be an end-user device or network (e.g., local area network (LAN)).

In the embodiment depicted in FIG. 1, the data network 107 utilizes an optical transport network; however, the system 100 described herein can be utilized with other communication networks; for example, these communication networks may correspond to suitable wired and/or wireless networks providing, for instance, a local area network (LAN), metropolitan area network (MAN), wide area network (WAN), or combination thereof. Moreover, the communication network may be a backbone network of a service provider. As such, the communication network may operate as an asynchronous transfer mode (ATM) network, frame relay network, integrated services digital network (ISDN), IP network, multi-protocol label switching (MPLS) network, or SONET network, as well as any other suitable network, or combination thereof.

By way of example, network 107 in FIG. 1 is a packet-switched (e.g., IP based) network configured for the transport of information (e.g., data, voice, video, etc.) between one or more sources (e.g., node 103 or node 105) and one or more destinations (e.g., node 105 or node 103). To assist with traffic engineering, service providers negotiate and apportion network capacity on general or subscriber-specific bases through service level agreements (SLA). These agreements define various communication service parameters in terms of bandwidth allocations, latency, jitter, etc.

Units of data (e.g., blocks, cells, frames, packets, etc.) transmitted across a transport environment are typically "policed" according to one or more committed rates of service, such as a committed burst bandwidth. These committed rates of service are generally associated with particular connection(s), e.g., links, pathways, etc., or other network parameters, e.g., incoming/outgoing interface, destination/source node, machine access control address, etc.

In the SONET network configuration shown in FIG. 1, the node 103 utilizes edge device 109 to connect to the IP network 107, and the node 105 utilizes edge device 111 to connect to the IP network 107. As seen in FIG. 1, edge devices 109 and 111 access IP network 107 via one or more routers (e.g., routers, 113, 115, 117, 119, etc.) by way of connections. Each router 113, 115, 117, and 119 uses a respective optical node, e.g., add/drop multiplexer (ADM) 121, 123, 125, and 127, to send the data along the SONET ring, which in this embodiment includes connections 129, 131, 133, and 135.

Data units (e.g., blocks, cells, frames, packets, etc.) transported over IP network 107 and, thereby, between edge devices 109 and 111, may traverse one or more other connections and/or nodes of IP network 107. At the outset of the communication between node 103 and node 105, a determination will be made regarding which router of routers 113, 115, 117, and 119 will be an ingress router and which router of routers 113, 115, 117, and 119 will be an egress router. The edge devices 109 and 111 may include traffic shapers configured to delay metered traffic according to one or more deterministic constraints (or rates of service), such as a maximum burst length (or size), maximum burst rate, sustainable burst length, sustainable burst rate, etc. It is noted that these traffic variables may be defined in terms of, for example, bandwidth allocations. Traffic shaping functions may be implemented by shaper through one or more buffers that temporarily "hold" and/or "schedule" units of data for transmission so that traffic shaper can disperse traffic as bandwidth becomes available on an outgoing connection.

In addition to the above determinations and on a different system layer than the above determinations, traffic flowing along an IP network 107 is routed along different flow paths (i.e., between different network interfaces) in an attempt to provide optimal utilization of the network capabilities. Traditionally, such physical layer determinations of the optimal flow path were based on network cost and/or metrics values that are preassigned between nodes of the network based on factors such as physical distance between nodes and other factors that determine normal latency between nodes. However, if a failure occurred at any point along the flow path on the SONET ring, then the SONET ADMs would simply transparently reroute traffic along a different path (e.g., a protection path) to achieve the same final destination as originally planned, without taking into consideration the increase in network cost/metrics involved with such a rerouting. An alternative system might perform constant monitoring of latency between nodes and constantly change paths based on such measurements. However, such a system would not provide a stable network as changes such as congestion would fluctuate relatively constantly, and therefore the network components would be greatly burdened by such changes.

The network management system 101 provides for monitoring and adjusting router interface selection to optimize data flow without overburdening the network components. The network management system 101 is configured to obtain measurements relating to flow data, such as latency, packet loss, and/or jitter, on a periodic basis (e.g., using International Telecommunications Union (ITU) Y.1731). ITU Y.1731 specifies mechanisms relating to the network and service aspects of ETH (Ethernet) layer. If the measurements fail to meet a minimum specification, then the network management system 101 reroutes traffic to an alternate path. The network management system 101 thus provides a method of collecting measurements latency, packet loss, and/or jitter on a frequent basis across network interfaces with configurable network cost/metrics values, and when measurements fail to meet a minimum specification, then changes the network cost/metrics value to a different preset value, thereby causing the control plane to reroute traffic to different path. This different path can be a more optimal route, in terms of costs and performance. Alternatively, the desirability of this different path can be based on a predetermined criteria used in conjunction with a rule or policy. In certain embodiments, the above functions for adjusting router interface selection can be performed within the network components themselves.

Figure 2:
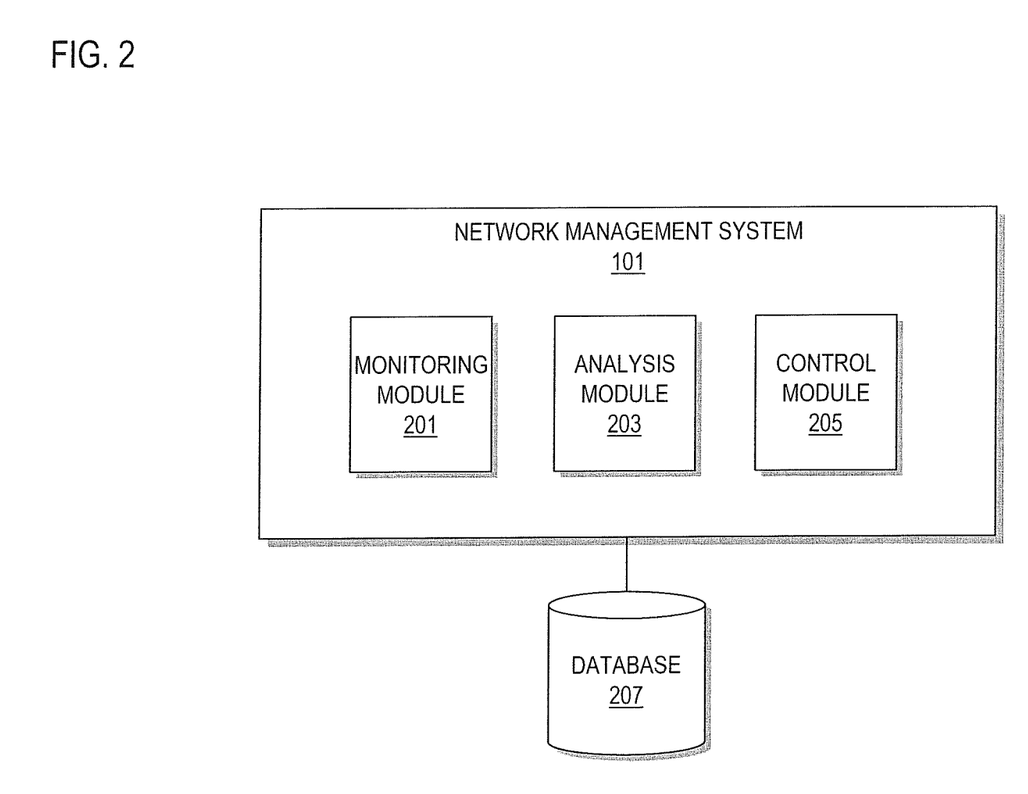
FIG. 2 is a schematic diagram of a network management system for adjusting network interface metrics, according to an exemplary embodiment.

As depicted in FIG. 2, the network management module 101 includes a monitoring module 201, and analysis module 203, and a control module 205. The network management system 101 also includes or can access a database 207. The monitoring module 201 is configured to measure flow data in between the various nodes of the SONET ring, such as latency, packet loss, and/or jitter, on a periodic basis, the length of which can be set by balancing the need for taking enough data points in order to ensure that needed adjustments are made to optimize data flow, with the burden that such measurements and adjustments will place upon the components of the network. Thus, the monitoring module 201 is responsible for taking measurements and collecting measurement data for storage in the database and/or analysis by the analysis module 203. The analysis module 203 performs the analysis of the measurement data to determine if a change needs to be made in the flow path, as will be described in greater detail below. The control module 205 notifies the routers 113, 115, 117, and/or 119 of any changes to adjust the rerouting of data flow to another path (e.g., more optimal route) when needed.

The system 100 addresses the problem of measuring latency, packet loss, and/or jitter in hardware such that the measurements reported can reliably used to make a determination about the quality of the network being tested as opposed to the load of central processing units (CPUs) involved in the testing. A traditional way to implement this kind of testing is with IP pings, which are typically not implemented in hardware, and require a CPU at the far end to respond, which decreases accuracy and could cause a protection switch if the CPU get busy. ITU Y.1731 specifies a standard way to do the types of testing required at Layer 2 (or L2) in a manner that is better suited to hardware implementation than typical IP testing.

Additionally, the system 100 addresses the problem of configuring network interfaces (e.g., IP interfaces) running over protected optical (e.g., SONET) facilities. In this example, it is assumed that a working (or primary) path of the SONET network is shorter than the secondary path (or protect path). Conventionally, when the SONET facility switches to the protect path, the IP network is not aware of the change, so traffic is likely to stay on a suboptimal path.

Figure 3A:
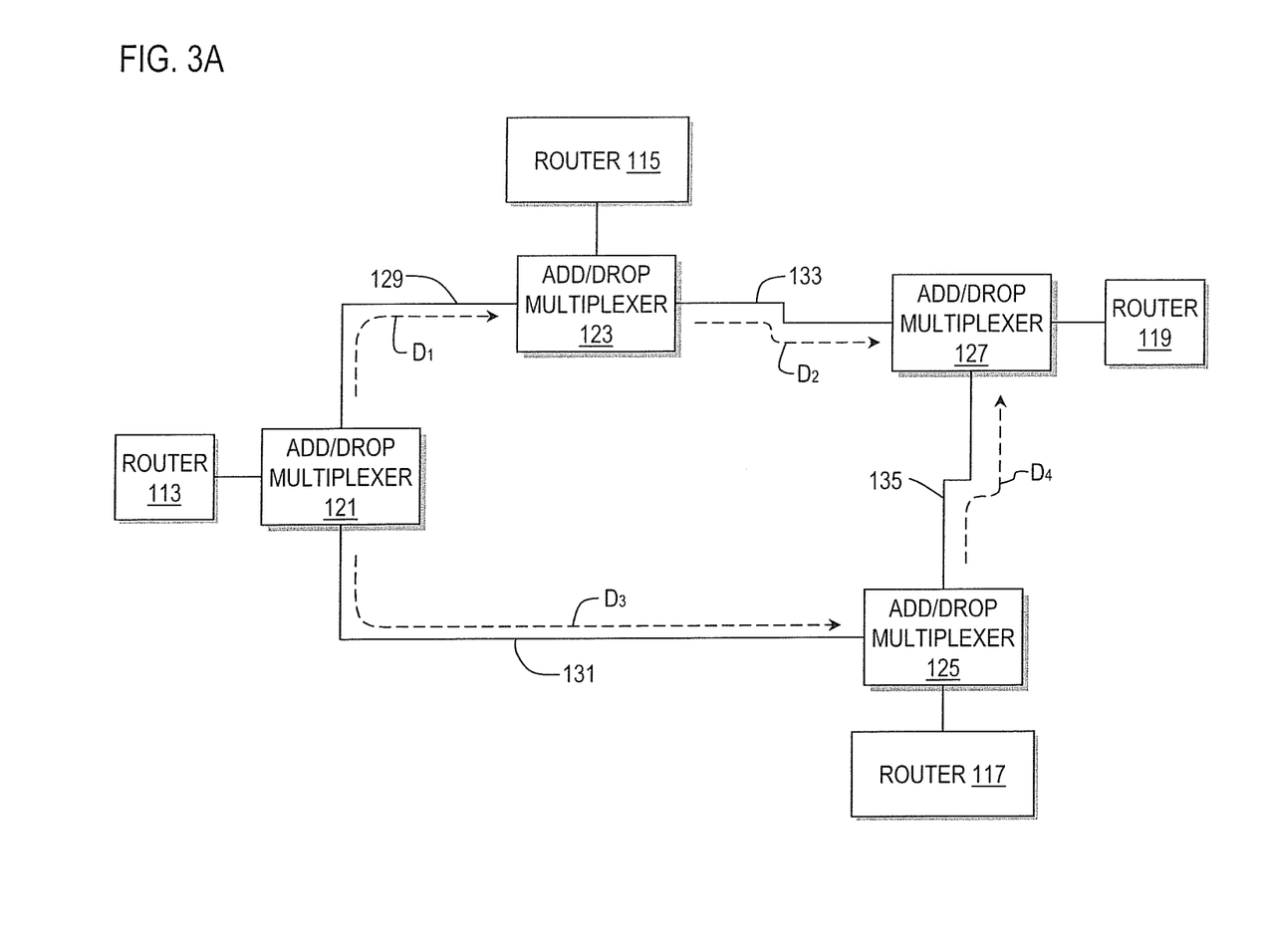
FIG. 3A is diagram of an optical network showing distance-based metrics of various network interfaces, according to an exemplary embodiment.

By way of illustration, FIG. 3A depicts a SONET ring where, if router metrics are proportional to distance, then traffic from router 113 to router 119 would normally go via router 115 if $D_1+D_2<D_3+D_4$. Thus, if the distance between router 113 and router 115 (i.e., $D_1$) is one hundred miles, the distance between router 115 and router 119 (i.e., $D_2$) is one hundred miles, the distance between router 113 and router 117 (i.e., $D_3$) is two hundred miles, and the distance between router 117 and router 119 (i.e., $D_4$) is one hundred miles, then traffic from router 113 to router 119 would travel from router 113 along connection 129 to router 115 and then from router 115 along connection 133 to router 119, for a total path of two hundred miles. Such a path would be considered the primary path or working path.

Figure 3B:
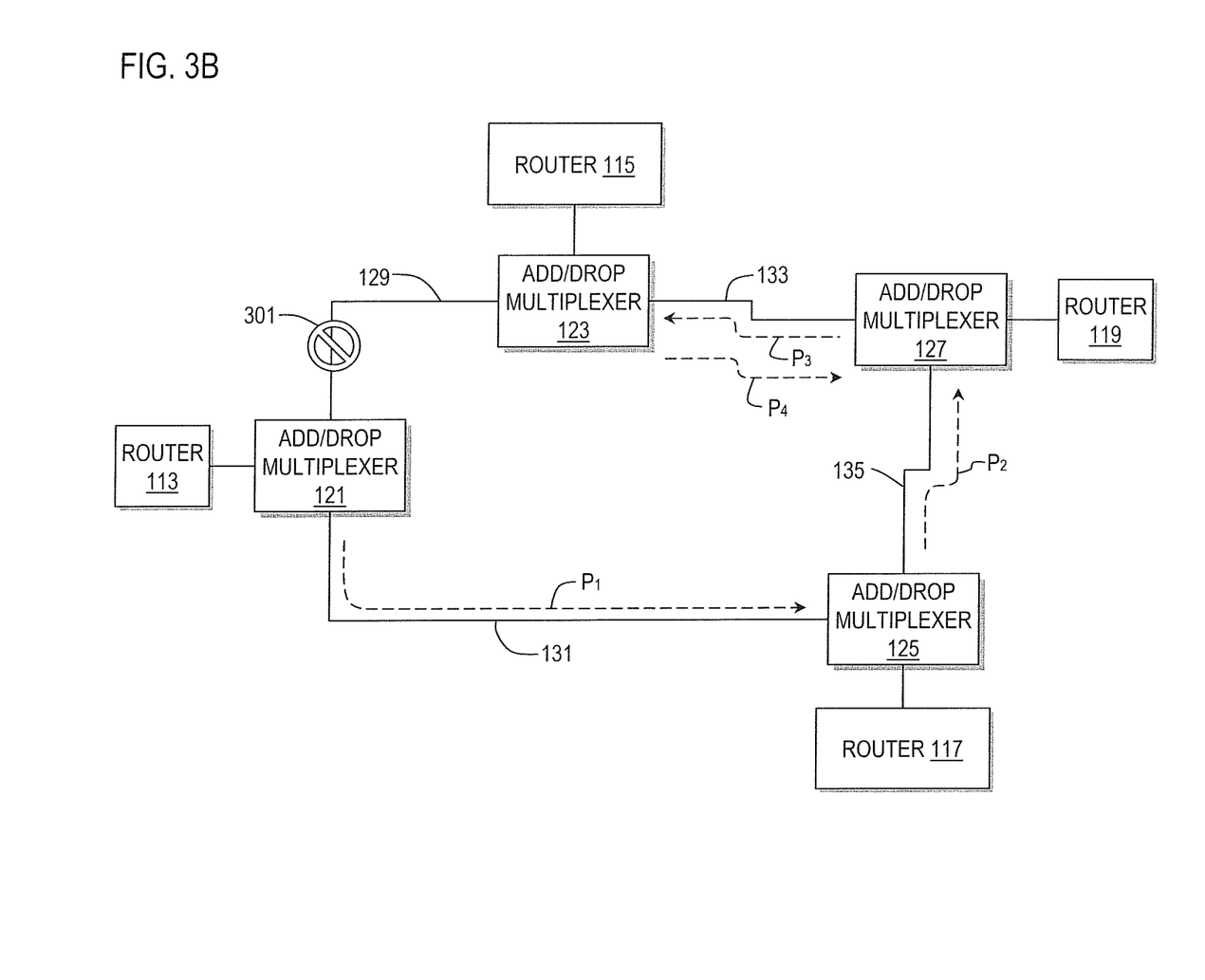
FIG. 3B is a depiction of the optical network of FIG. 3A showing sub-optimal operation thereof in view of a failure of one of the network interfaces.

However, in a traditional system, if there was a fiber cut 301 along connection 129 between router 113 and router 115, as shown in FIG. 3B, the SONET ADMs 121, 123, 125, and 127 would transparently reroute traffic from router 113 to router 115 through ADM 125 and AMD 127. Such a rerouting would direct traffic from ADM 121 along connection 131 as path $P_1$ (equal in distance to $D_3$) to ADM 125, from ADM 125 along connection 135 as path $P_2$ (equal in distance to $D_4$) to ADM 127, from ADM 127 along connection 133 as path $P_3$ (equal in distance to $D_2$) to ADM 123, and then from ADM 123 back along connection 133 as path $P_4$ (equal in distance to $D_2$) to ADM 127 to router 119. Such rerouting (or redirection) of traffic would increase the distance travelled by the data from router 113 to router 115 to four hundred miles and the total distance travelled by the data from router 113 to router 119 to five hundred miles. This traversal may be unnecessary if other paths that are less costly can be utilized.

Figure 3C:
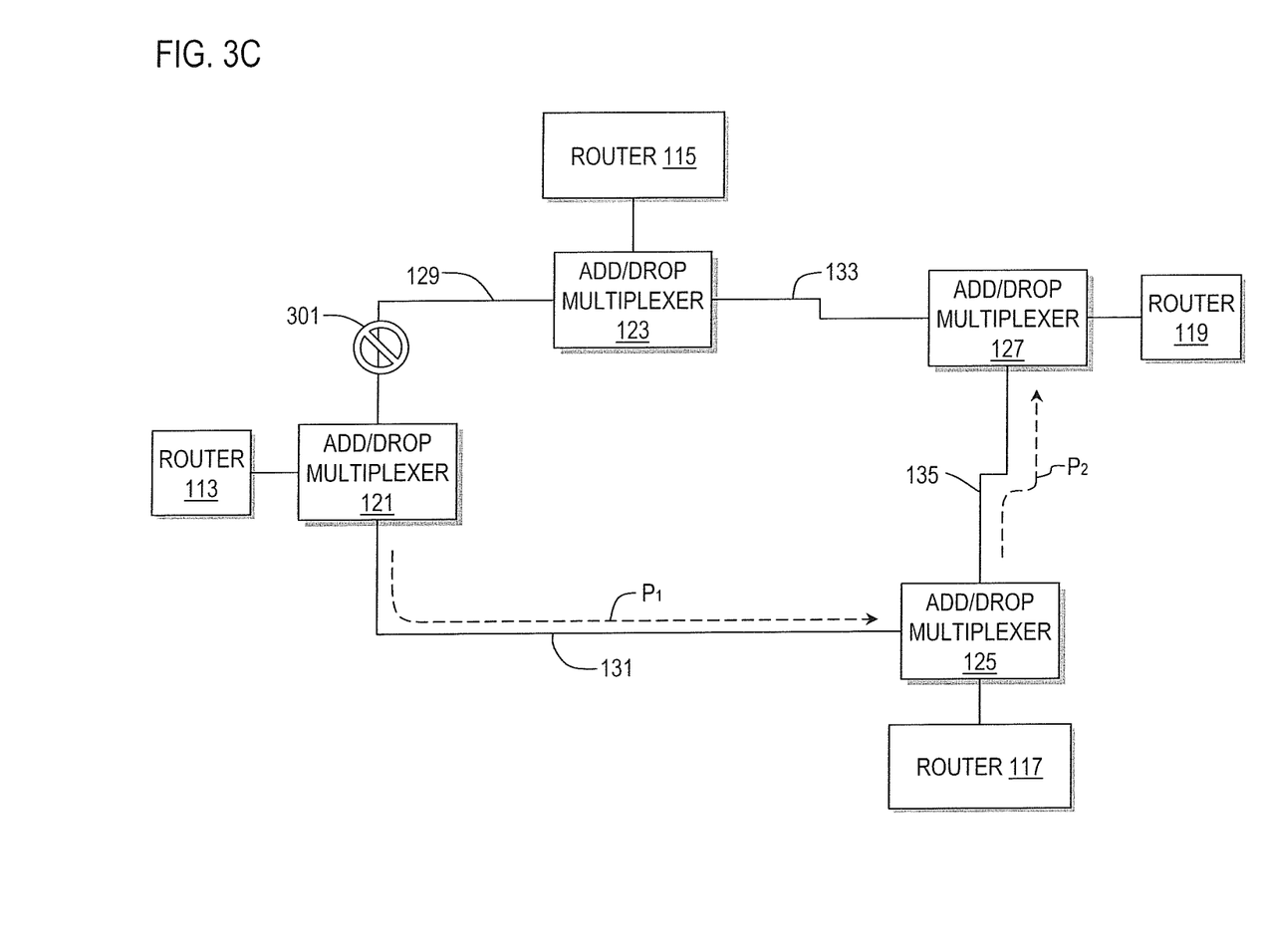
FIG. 3C is a depiction of the optical network of FIG. 3A showing optimal operation thereof in view of a failure of one of the network interfaces, according to an exemplary embodiment.

The network management system 101 provides a way to notify the routers 113-119 and the network control plane associated with the ADMs 121-127 of the change (e.g., the fiber cut 301, etc.) so that traffic can be rerouted to the shortest path or optimal path. Effectively, the network management system 101 provides a means in which to monitor the network, analyze whether changes have occurred, and control rerouting of the traffic when needed. Thus, the network management system 101 can be used to make router 113 aware of the failure along connection 129 at 301, so that router 113 can reroute traffic through router 117, as shown in FIG. 3C. Accordingly, such a rerouting would direct traffic from ADM 121 along connection 131 as path $P_1$ to ADM 125, and then from ADM 125 along connection 135 as path $P_2$ to ADM 127 to router 119. Therefore, such a rerouting would decrease the total distance travelled by the data from five hundred miles in FIG. 3B to three hundred miles in FIG. 3C.

Thus, the network management system 101 includes a monitoring module 201 that takes real time measurements of latency, packet loss, and/or jitter, for example, using Y.1731 implemented in hardware. Also, an analysis module 203 provides real time determinations of the network's ability to meet the minimum required latency, packet loss, and/or jitter. If a pre-programmed condition is met (e.g., 2 or more out of last 100 packets lost, or average latency of last 5 packets exceeds 20 ms), then a control module 205 can take action to reroute traffic to a different path, for example, by changing the interface cost/metric value on a network trunk or by signaling to the end user that the link no longer meets the user's requirements. By using an L2 method of generating test frames and measuring network characteristics, the interval between test packets can be reduced as low as required for the desired performance without risk of overrunning a general purpose CPU that has many other tasks running at any given time. In addition, using standard test measurements allows one-way testing to be done for interoperability testing, and ensures consistent operation across multiple vendors and equipment types, thereby easing configuration and appropriate metric selection.

Figure 4:
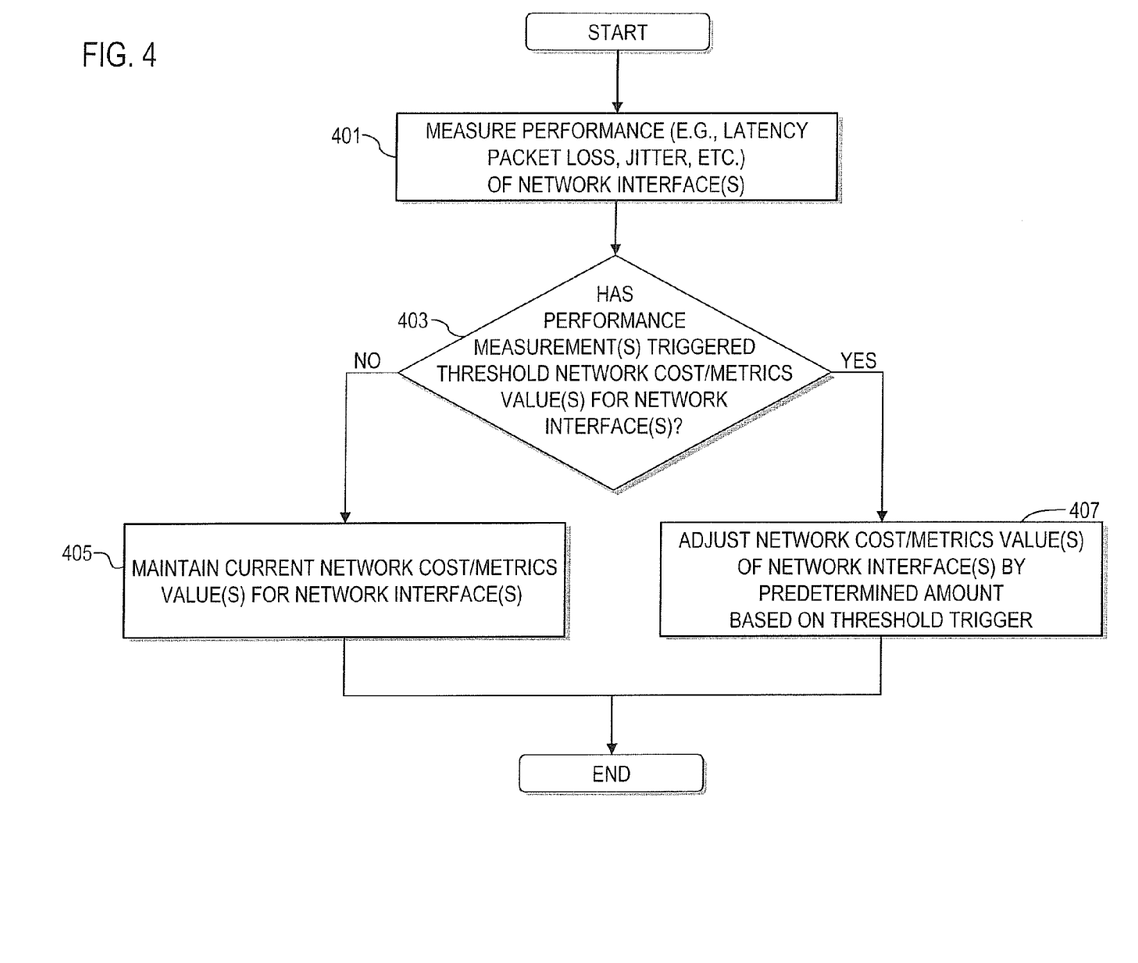
FIG. 4 is a flowchart of a process for adjusting network interface metrics, according to an exemplary embodiment.

In one embodiment, as shown in FIG. 4, the monitoring module 201 of the network management system 101 measures performance of the various network interfaces, in step 401. For example, the monitoring module 201 can take real time measurements of latency, packet loss, and/or jitter between the various nodes. The analysis module 203 then analyzes the measured data to determine if the performance measurements have triggered a threshold network cost/metrics value in step 403. For example, the analysis module 203 makes a real time determination of a correct network cost/metric based on a set of preset values and a defined threshold or threshold value in order to determine whether an adjustment of the network cost/metrics value(s) of one or more network interfaces needs to be made. If no threshold has been triggered, then the current network cost/metrics values are the network interfaces are maintained, as shown in step 405. However, if one or more threshold values are triggered, then the control module 205 adjusts the network cost/metrics value(s) of the network interface(s) by a predetermined amount based on the threshold triggered, as shown in FIG. 407. Thus, the control module 205 effectively instructs the network control plane (not shown) to reroute traffic around network degradations.

For example, in a scenario where costs are based on latency and distance, each network interface could be assigned two costs (a low value and a high value) and a latency threshold over which cost should be changed from the low value to the high value. Thus, in the configuration shown in FIG. 1, two metrics between router 113 and 115 could be set at one hundred miles (e.g., which equals the distance $D_1$ along connection 129) and four hundred miles (e.g., which equals the distances $D_3+D_4+D_2$ along connections 131, 135, and 133, respectively), with a latency threshold of, for example, 7 ms round trip if normal latencies are 2 ms via connection 129 and 8 ms via connections 131, 135, and 133. Thus, the routers could take latency measurements every 50 ms, which can be monitored by the monitoring module 201, and if the analysis module 203 determines that a predetermined number of measurement(s) (e.g., three measurements in a row) are over the threshold latency of 7 ms, then the control module 205 can notify the routers of the change in metrics between router 113 and router 115 from one hundred miles to four hundred miles. Thus, the increase in latency between router 113 and router 115 to 8 ms and increase in the metric to 400 miles would cause the router 113 to reroute the traffic through router 117 in the manner shown in FIG. 3C.

Figure 5:
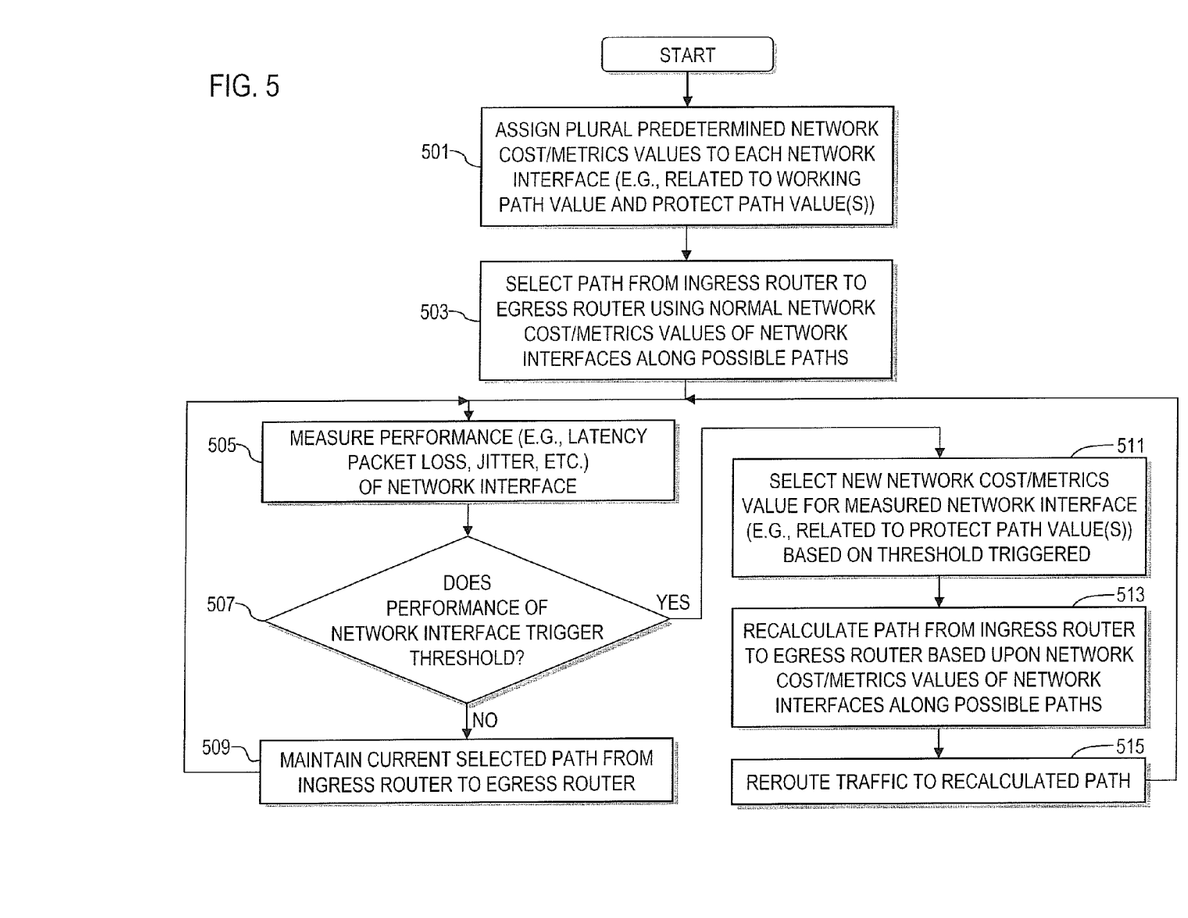
FIG. 5 is a flowchart of a process of routing traffic through a network using a network management system, according to an exemplary embodiment.

FIG. 5 depicts a process of routing traffic through a network using the network management system described above. In step 501, each network interface is assigned plural predetermined network cost/metrics values, for example, that can be related to a working path value (e.g., the low value discussed above) and a protect path value (e.g., the high value discussed above). Then, in step 503, the initial primary path used to send data from an ingress router to an egress router is selected using the normal network cost/metrics values (e.g., the working path values) of the various network interfaces along the various possible paths. For example, the routers would select the primary path based upon the lowest possible combined network cost/metrics values of the various combinations of network interfaces.

In step 505, the network management system 101 would perform periodic, real-time measurements of the performance (e.g., latency, packet loss, jitter, etc.) of the network interfaces. Then, in step 507, the network management system 101 would determine whether performance of any of the network interfaces trigger a threshold. For example, the threshold could be triggered if a certain value of the performance feature being measured is reached, or the threshold could be triggered if a certain value of the performance feature being measured is reached a certain number of times during a certain period of time or a certain number of consecutive times, etc. If the threshold has not been triggered, then in step 509 the current selected path from the ingress router to the egress router is maintained and the process loops back to step 505. If the threshold has been triggered, then the process proceeds to step 511.

In step 511, a new network cost/metrics value is selected for the measured network interface for which a threshold was triggered. For example, the triggered network interface could be reassigned to have a protect path value (e.g., the high value discussed above). Then, in step 513, the path from the ingress router to the egress router would be recalculated using currently assigned network cost/metrics values, which includes any new network cost/metrics value(s). In step 515, the data traffic is then rerouted to the recalculated path. For example, the routers are notified of the updated network cost/metrics values and would then select a new primary path based upon the lowest possible combined network cost/metrics values of the various combinations of network interfaces, and reroute traffic to the new primary path. The process would then loop back to step 505, where the network management system 101 would again measure performance of the network interfaces and make adjustments based on the set thresholds. For example, the system 101 could drop the network cost/metrics value of the previously adjusted interface back from the protect path value to the working path value if the measured performance warranted such an adjustment based on the threshold triggered, recalculate the path, and then reroute traffic to the recalculated path.

The above system 101 could also be applied to routers interconnected across trunks of variable bandwidth, in which high packet loss could be used to increase bandwidth-based metrics to compensate for a decrease in trunk bandwidth (e.g., sub-rate GE trunk bandwidth changes from OC12 to OC3 due to a failure). Also, the system could implement multiple measurements into a two-dimensional matrix used for metric selection or to abstract the metric selection to one of a number, n, of possible metrics based on n-1 thresholds (e.g., measurement intervals of less than M1, between M1 and M2, or greater than M2 with costs of C1, C2, and C3). In an exemplary embodiment, this measurement functionality would be implemented in hardware and not require a CPU at the far end to respond, which decreases accuracy and could cause a protection switch if the CPU get busy. Existing functionality supports sending traffic on an unused VLAN dedicated to measurement with testing in hardware or sending traffic to an IP address on an active VLAN, which requires CPU intervention. Once the measurement capability is in place, then packets could be sent at a custom interval (at a custom frame size) and once some condition is met (e.g., 2 out of last 100 packets lost, or average latency of last 5 packets exceeds 20 ms), then the system can notify the router to change the metric.

This approach of selecting a preset metric based on measurements is more stable than implementations that directly calculate metrics from measurements, since such measurements are likely to vary with traffic load causing directly calculated metrics to change when there are no underlying physical layer failures.

Users of the system 101 as described herein may include service providers and/or end-users with latency-sensitive or packet loss-sensitive applications or services in which there are multiple paths through the network and need accurate measurement capabilities to measure the quality of individual network link or end-to-end paths so that traffic can be rerouted if needed. For example, this arrangement can be beneficial to service providers and/or end-users with IP networks trunked across SONET/Ethernet networks with restoration capabilities in which the restored path has qualities that are inferior to the original path (e.g., higher latency or lower bandwidth).

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
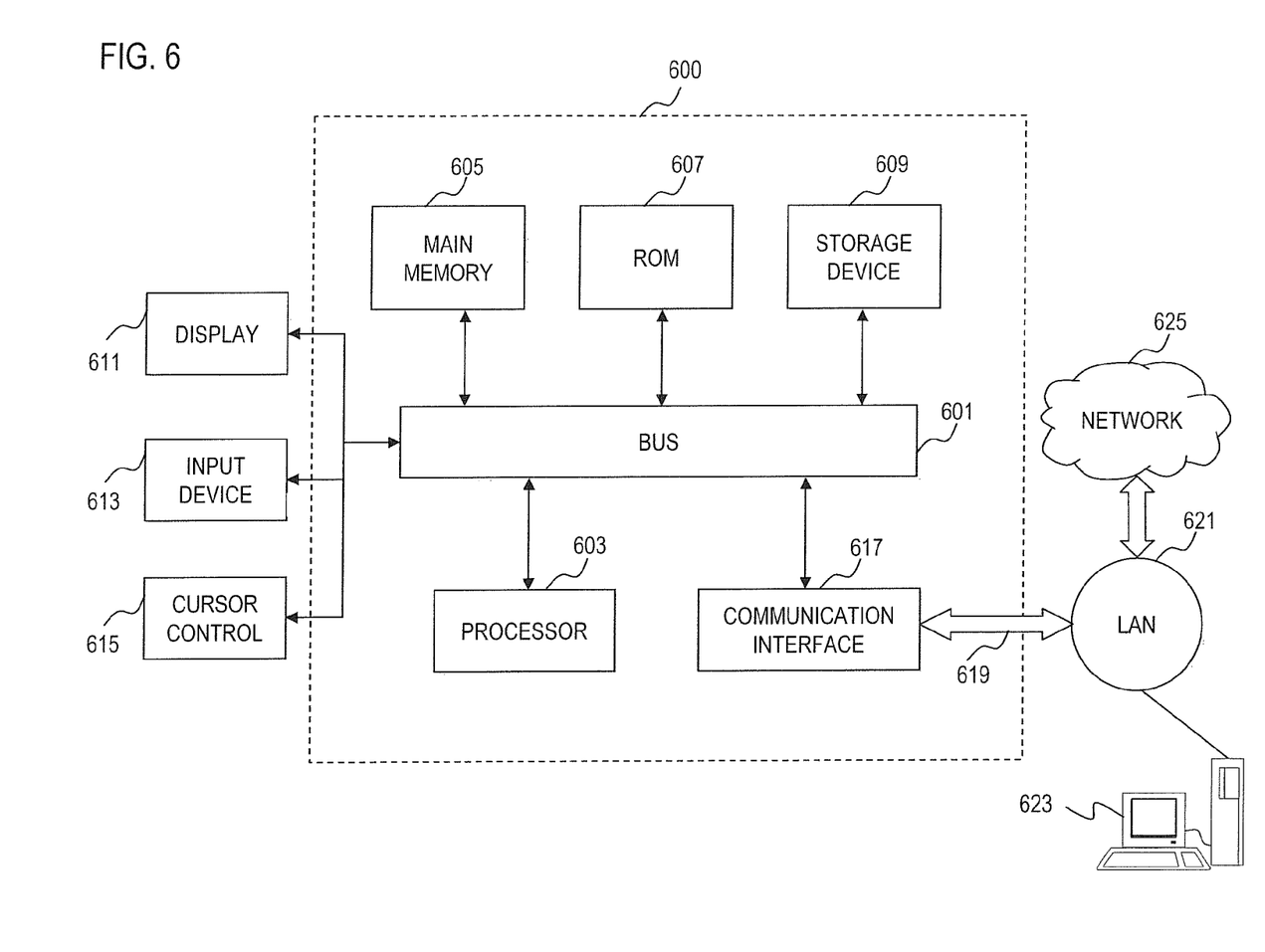
FIG. 6 is a diagram of a computer system that can be used to implement various exemplary embodiments.

FIG. 6 illustrates computing hardware (e.g., computer system) 600 upon which an embodiment according to the invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

The invention claimed is:

1. A method comprising:
measuring a performance metric of one or more network interfaces of an initial network path providing traffic flow across a network;
determining whether the measured performance metric for each network interface satisfies a corresponding predetermined threshold; and
adjusting an interface metric value of each network interface for which the measured performance metric of the network interface fails to satisfy the corresponding predetermined threshold.

2. The method according to claim 1, further comprising:
determining, based on the adjusted interface metric value(s), an alternate network path for providing the traffic flow across the network; and
rerouting the traffic flow over the alternate path.

3. The method according to claim 1, further comprising:
assigning a plurality of predetermined interface metric values to each network interface, wherein the adjusted interface metric value of a one network interface is selected from the plurality of predetermined interface metric values assigned to the one network interface.

4. The method according to claim 3, wherein the plurality of predetermined interface metric values for each network interface are based at least in part upon one or more physical distances between nodes of the network.

5. The method according to claim 1, wherein the measured performance metric comprises one or more of latency, packet loss, and jitter.

6. The method according to claim 1, wherein the satisfaction of the predetermined threshold for a one network interface is determined based on the measured performance metric for the one network interface over a predetermined period of time or for a predetermined number of measurements.

7. The method according to claim 1, further comprising:
selecting the initial network path to provide the traffic flow from an ingress location across the network to an egress location,
wherein the network interfaces of the initial network path are selected to minimize a resulting combined interface metric value.

8. The method according to claim 2, wherein the initial network path provides the traffic flow from an ingress location across the network to an egress location, and wherein the alternate network path is determined to provide the traffic flow from the ingress location across the network to the egress location.

9. An apparatus comprising:
a monitoring module configured to measure a performance metric of one or more network interfaces of an initial network path providing traffic flow across a network;
an analysis module configured to determine whether the measured performance metric for each network interface satisfies a corresponding predetermined threshold; and a control module configured to trigger an adjustment of an interface metric value of each network interface for which the measured performance metric of the network interface fails to satisfy the corresponding predetermined threshold.

10. The apparatus according to claim 9, wherein each network interface corresponds with a plurality of predetermined interface metric values and the adjusted interface metric value of a one network interface is selected from the corresponding plurality of predetermined interface metric values.

11. The apparatus according to claim 10, wherein the plurality of predetermined interface metric values for each network interface are based at least in part upon one or more physical distances between nodes of the network.

12. The apparatus according to claim 9, wherein the measured performance metric comprises one or more of latency, packet loss, and jitter.

13. The apparatus according to claim 9, wherein the satisfaction of the predetermined threshold for a one network interface is determined based on the measured performance metric for the one network interface over a predetermined period of time or for a predetermined number of measurements.

14. A system comprising:
a plurality of network interfaces of an optical network; and
a network management device, comprising:
a monitoring module configured to measure a performance metric of one or more of the network interfaces of an initial network path providing traffic flow across the optical network, wherein the network interfaces operate at a higher layer protocol than the optical network;
an analysis module configured to determine whether the measured performance metric for each network interface of the initial path satisfies a corresponding predetermined threshold; and
a control module configured to adjust an interface metric value of each network interface for which the measured performance metric of the network interface fails to satisfy the corresponding predetermined threshold.

15. The system according to claim 14, wherein each network interface corresponds with a plurality of predetermined interface metric values and the adjusted interface metric value of a one network interface is selected from the corresponding plurality of predetermined interface metric values.

16. The system according to claim 15, wherein the plurality of predetermined interface metric values for each network interface are based at least in part upon one or more physical distances between nodes of the network.

17. The system according to claim 14, wherein the measured performance metric comprises one or more of latency, packet loss, and jitter.

18. The system according to claim 14, wherein the satisfaction of the predetermined threshold for a one network interface is determined based on the measured performance metric for the one network interface over a predetermined period of time or for a predetermined number of measurements.

19. The system according to claim 14, wherein the control module is configured to send the adjusted interface metric value of each network interface to one or more routers used to select a path to carry the traffic flow from an ingress location across the network to an egress location.

20. The system according to claim 19, wherein the adjusted interface metric values are used for selection of an alternate path for providing the traffic flow from the ingress location across the network to the egress location, where the network interfaces of the alternate path are selected to minimize a resulting combined interface metric value.

* * * * *